(12) United States Patent
Hippchen et al.

(10) Patent No.: US 10,062,521 B2
(45) Date of Patent: Aug. 28, 2018

(54) ELECTRODE FOR A COMBINATION OF SUPERCAPACITOR AND BATTERY AND ALSO PROCESS FOR THE PRODUCTION THEREOF

(71) Applicant: Robert Bosch GmbH, Stuttgart (DE)

(72) Inventors: Silvan Hippchen, Sersheim (DE); Rene Hornung, Eisenach (DE); Andreas Netz, Ludwigsburg (DE); Armin Glock, Urbach (DE); Christoph Brehm, Hatvan (HU); Stefan Doerne, Stuttgart (DE); Lutz Baumgaertner, Stuttgart (DE); Ahmed Louati, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 14/885,238

(22) Filed: Oct. 16, 2015

(65) Prior Publication Data
US 2016/0111225 A1  Apr. 21, 2016

(30) Foreign Application Priority Data

Oct. 16, 2014  (DE) .................. 10 2014 220 953

(51) Int. Cl.
*H01M 4/131* (2010.01)
*H01M 10/0525* (2010.01)
(Continued)

(52) U.S. Cl.
CPC ............. *H01G 11/04* (2013.01); *H01G 11/24* (2013.01); *H01G 11/26* (2013.01); *H01G 11/28* (2013.01); *H01G 11/30* (2013.01); *H01G 11/32* (2013.01); *H01G 11/86* (2013.01); *H01M 4/043* (2013.01); *H01M 4/0404* (2013.01); *H01M 4/13* (2013.01); *H01M 4/139* (2013.01); *H01M 12/005* (2013.01); *H01M 10/052* (2013.01); *H01M 2220/20* (2013.01); *H01M 2220/30* (2013.01);
(Continued)

(58) Field of Classification Search
CPC ............... H01M 16/00; H01M 12/005; H01M 10/4264; H01M 10/0525; H01M 4/131; H01M 4/1391; H01G 11/04
See application file for complete search history.

(56) References Cited

U.S. PATENT DOCUMENTS 5,419,977 A * 5/1995 Weiss ............... H01M 10/4264
429/303
6,800,222 B1 * 10/2004 Noguchi ............... H01G 9/155
252/502

FOREIGN PATENT DOCUMENTS

| DE | 10039174 | 5/2001 |
|---|---|---|
| JP | 3013419 | 2/2000 |
| WO | 2014/130491 | 8/2014 |

OTHER PUBLICATIONS

Machine Translation of: JP 3013419 B, Konuki et al., Feb. 28, 2000.*

* cited by examiner

Primary Examiner — Kenneth J Douyette
(74) Attorney, Agent, or Firm — Michael Best & Friedrich LLP

(57) ABSTRACT

An electrode (10) for a combination of supercapacitor and battery, comprising an active structure (12), wherein the active structure (12) comprises an active material layer (18) which is divided into strips in the plane and capacitor strips (16) and battery strips (14) are arranged alternately in the plane, is proposed. Also a process for producing such an electrode (10) and a combined supercapacitor and battery cell comprising at least one such electrode.

12 Claims, 3 Drawing Sheets

(51) Int. Cl.
*H01M 12/00* (2006.01)
*H01G 11/04* (2013.01)
*H01M 4/04* (2006.01)
*H01G 11/24* (2013.01)
*H01G 11/26* (2013.01)
*H01G 11/28* (2013.01)
*H01G 11/30* (2013.01)
*H01G 11/32* (2013.01)
*H01G 11/86* (2013.01)
*H01M 4/13* (2010.01)
*H01M 4/139* (2010.01)
*H01M 10/052* (2010.01)

(52) U.S. Cl.
CPC ............ *Y02E 60/122* (2013.01); *Y02E 60/13* (2013.01); *Y02P 70/54* (2015.11); *Y02T 10/7022* (2013.01)

ELECTRODE FOR A COMBINATION OF SUPERCAPACITOR AND BATTERY AND ALSO PROCESS FOR THE PRODUCTION THEREOF

BACKGROUND OF THE INVENTION

The invention relates to an electrode for a combination of supercapacitor and battery, where the electrode has an active structure. Further aspects of the invention concern processes for producing such an electrode and also a combined supercapacitor and battery cell comprising at least one such electrode.

Electric energy can, for example, be stored by means of batteries or by means of capacitors. Batteries store the electric energy in the form of chemical reaction energy and capacitors store the electric energy in the form of charges on capacitor electrodes. A battery comprises at least one positive electrode and at least one negative electrode which are separated by means of a separator. Owing to their high energy density, use is frequently made of lithium ion batteries which also display a low self discharge. In the lithium ion battery cells used in lithium ion batteries, lithium ions migrate from one electrode to the other electrode during charging and discharging of the battery. As active materials for the electrodes, use is frequently made of intercalation materials which are able to reversibly incorporate and release lithium ions. A lithium ion conductor is used for transport of the lithium ions. In the case of lithium ion battery cells used at present, which are employed, for example, in the consumer sector (cellular telephone, MP3 player, etc.) or as energy store in electric or hybrid vehicles, the lithium ion conductor is frequently a liquid electrolyte which, for example, contains the lithium electrolyte salt lithium hexafluorophosphate ($LiPF_6$) as a solution in organic solvents.

In batteries, the specific power offtake, i.e. the discharge rate, also referred to as C rate, is limited. In addition, it is possible for the battery to be damaged when the battery is discharged at high C rates because the internal currents become too high. The same problem occurs during charging of a battery: charging of a battery can also be carried out only at a particular C rate without damaging the battery. The C rate is defined as the maximum permissible charging or discharging current divided by the capacity of the battery.

For the purposes of the present patent application, the term battery or battery cell is used as is customary in the conventional language, i.e. the term battery or battery cell encompasses both a primary battery or primary battery cell and also secondary batteries or secondary cells. The latter are also referred to as rechargeable batteries or rechargeable battery cells.

In contrast to batteries, capacitors can provide very high charging and discharging currents without being damaged. For this reason, capacitors are suitable as replacement for batteries or for supplementing batteries by means of a parallel connection of battery and capacitor when a high degree of reliability and high charging and discharging currents are required.

Capacitors comprise two electrodes which are arranged parallel to one another at a small spacing. A dielectric is generally present in-between. Various construction types of capacitors are known in the prior art, with supercapacitors having a specific capacitance which is up to 10 000 times as great as that of conventional electrolyte capacitors. However, a supercapacitor achieves only about 10% of the capacity of a battery of the same weight. In the case of supercapacitors, no dielectric is used between the two electrodes. The structure of these supercapacitors resembles that of a battery and comprises two electrodes which are mechanically separated from one another by a separator and are electrically connected to one another by means of an electrolyte. Application of a voltage to the capacitor results in formation of double layers on the electrodes, in which double layers a layer of positive charges and a layer of negative charges are formed in a mirror-like arrangement. In addition, pseudocapacitances can be formed when ions come into direct contact with the surface of the electrode and release an electron to the electrode. The total capacitance of the supercapacitor is then made up of the double layer capacitance and the pseudocapacitance.

A disadvantage of the prior art is that there is no simple component which combines both battery properties and capacitor properties.

SUMMARY OF THE INVENTION

An electrode for a combination of supercapacitor and battery is proposed. The electrode comprises an active structure which comprises an active material layer which is divided stripwise in the plane, with capacitor strips and battery strips being arranged alternately in the plane.

The active materials of a capacitor electrode and of a battery electrode, respectively, are present in the capacitor strips and battery strips of the active material layer. During production of the electrode, the respective active materials are positioned, in the form of alternating strips and spatially separated from one another, in the active material layer of the active structure.

In the case of the capacitor strip, a capacitor active material which generally comprises a mixture of graphite and further additives such as a conductive material and/or an electrolyte is used.

The battery strips contain a battery active material which generally comprises a mixture of graphite and, depending on the configuration of the battery strip as cathode or anode of the battery, an anode active material or a cathode active material. Furthermore, further additives, for example a conductive material or an electrolyte, can be added to the battery active material.

In the case of a cathode, the cathode active material can, for example, be selected from among a lithiated transition metal oxide, for example $Li(NiCoMn)O_2$, $LiMn_2O_4$, $Li_2MO_3 \cdot LiMO_2$ (where M is, for example, Ni, Co, Mn, Mo, Cr, Fe, Ru or V), $LiMPO_4$ (where M is, for example, Fe, Ni, Co or Mn), $Li(Ni_{0.5}Mn_{1.5})O_4$, $Li_xV_2O_5$, $Li_xV_3O_8$ (where $0 \leq x \leq 2$), and further cathode materials known to those skilled in the art, e.g. borates, phosphates, fluorophosphates, silicates. A further possibility for the active material is, for example, a lithiated sulfur.

In the case of an anode, the anode active material is, for example, selected from among a graphite, silicon and metallic lithium and films coated with lithium.

Binders can optionally also be added to the capacitor active material or the battery active material in order to increase the stability. The binders are frequently plastics or polymers. For example, PVdF (polyvinylidene fluoride) is suitable as binder.

The conductive material used in the capacitor strips and/or battery strips can, for example, be selected from among carbon nanotubes, a conductive carbon black, graphene, graphite, metal particles, treated carbon particles, carbon nanotubes, carbon filaments, metal nanotubes, metal filaments and a combination of at least two of these materials.

For liquid electrolytes in capacitors, use is made of aqueous electrolytes up to cell voltages of about 2.3 V or organic solvents, with in each case acids, bases or salts additionally being dissolved in the electrolyte in order to increase the electrical conductivity. The organic electrolytes typically used for batteries because of the relatively high cell voltage and the high dielectric strength therefore required can also be used for capacitors. The electrolyte for batteries can be, for example, a solid electrolyte based on polyethylene oxide (PEO) or based on soya. In the case of a liquid electrolyte, the lithium electrolyte salt lithium hexafluorophosphate (LiPF$_6$), for example, can be used as a solution in an organic solvent. Furthermore, it is possible to dissolve not only lithium salts for the capacitor function but additionally also acids, bases or salts in the solvent in order to increase the electrical conductivity. Solutions of quaternary ammonium salts or alkylammonium salts such as tetraethylammonium tetrafluoroborate (N(Et)$_4$BF$_4$) or triethyl(methyl)ammonium tetrafluoroborate (NMe(Et)$_3$BF$_4$), for example, are customary for organic electrolytes in capacitor technology.

The graphite present in the capacitor active material or in the battery active material is, for example, a pressed expanded graphite. Graphite can be converted into expandable graphite by means of an acid treatment, for example with chromic acid or sulfuric acid. The expandable graphite can be mixed with the further materials present in the capacitor strip or in the battery strip and subsequently be heat treated at a temperature of from about 850 to 900° C., forming expanded graphite. When expanded graphite is pressed in a pressing apparatus, a stable self-supporting sheet can be produced.

In advantageous embodiments of the invention, further strips having a further function can be introduced between a battery strip and a capacitor strip in the active material layer. Examples of such further strips encompass conductivity strips which have a high proportion of graphite and optionally additional conductive materials. A further embodiment is formed by barrier strips which, for example, contain a polymer material and serve as frames or diffusion barriers. It is likewise conceivable to provide a barrier strip with additives which can suppress undesirable secondary reactions between constituents of the active material layer. Diffusion barriers can, in particular, be used in order to counter mixing of constituents of a battery strip and of a capacitor strip. A further embodiment is formed by insulation strips which have no electrical conductivity or only a low electrical conductivity and thus form an insulator between two strips, in particular between a battery strip and a capacitor strip.

In one embodiment of the electrode, the active structure comprises three layers, with a first graphite layer, the active material layer and a second graphite layer being arranged in this order.

In this variant, the active material layer is surrounded by graphite. Here, the graphite layers preferably comprise expandable graphite which has been expanded and pressed to form a stable layer. A binder is optionally added to the graphite in order to increase the stability and the elasticity. A high elasticity is particularly advantageous in connection with battery strips in the case of which a volume change occurs during charging or during discharging. If a high elasticity is required, a silicone, for example, can be used as binder.

In this embodiment, the proportion of binder in the active material layer, i.e. in the capacitor active material and the battery active material, can advantageously be reduced or the active material layer can be made completely free of a binder such as PVdF.

The first graphite layer and/or the second graphite layer preferably comprises an additive in the form of a conductive material. This gives the first and/or second graphite layer good electrical conductivity, so that these can form a contact to the active material layer like a power outlet lead.

In a further embodiment of the invention, the active material layer has a gradient perpendicular to the plane in which the active material layer has the strip structure, with the proportion of graphite and/or of a binder being lowest in the middle of the active material layer and increasing in the direction of the two surfaces.

In this variant, a structure which resembles the three-layer system comprising the first graphite layer, the active material layer and the second graphite layer is formed, but the transitions are fluid. The gradient in the direction perpendicular to the plane in which the active material layer is divided into strips leads to the concentration of graphite and/or of a binder being greatest at the surfaces of the active material layer. As in the previous embodiment, a result is that the capacitor active material is advantageously essentially enclosed by graphite even though there is no sharp boundary between a graphite layer and the active material layer. In a development of this variant, it is likewise possible to add a conductive material in order to improve the electrical conductivity, with a gradient also being able to be set for the conductive material so that the proportion of conductive material is lowest in the middle of the active material layer and increases in the direction of the two surfaces.

In a further embodiment of the invention, the active material layer has a gradient perpendicular to the plane of the active material layer, with the proportion of graphite being highest in the middle of the active material layer and decreasing in the direction of the two surfaces. In this variant, the active material layer of the electrode has a layer which consists essentially of graphite in its interior. Since graphite is a relatively good electrical conductor, a power outlet lead can be provided in this way in the interior of the active material layer over the cross section. A conductive material can optionally be added as additive to the graphite in order to effect a further improvement in the electrical conductivity. In this embodiment, the active material layer can advantageously be made very thick since the outward conduction of power is not only possible via the surfaces of the active material layer but is also assisted by the graphite layer in the interior.

In addition, it is possible for the proposed electrodes to comprise a power outlet foil on which the active structure is arranged.

Such a power outlet foil is generally a thin metal foil or a polymer film coated with a metal. If the battery strips of the electrode are configured as cathode for a lithium ion battery cell, an aluminum foil having a thickness in the range from 13 µm to 15 µm, for example, is used. In the case of production of an electrode having battery strips configured as anode, a copper foil having a thickness in the range from 6 µm to 12 µm, for example, is used. In further embodiments, it is also conceivable to use a graphite foil as power outlet foil.

A further aspect of the invention is to provide a process for producing one of the electrodes described. Here, features described for the electrode apply analogously to the process and, conversely, features described for the process apply analogously to the electrode.

In the proposed process for producing an electrode for a combination of supercapacitor and battery, starting materials for the active structure are introduced together into a pressing apparatus and pressed without addition of solvents to form a sheet, with the starting materials being introduced spatially distributed into the pressing apparatus by means of a plurality of application systems.

The pressing apparatus can be, for example, a calender. The starting materials for the capacitor strips, the battery strips and optionally for the graphite layers are supplied separately to the application systems. The application systems for producing the active material layer are configured, for example, with a plurality of nozzles which are arranged next to one another and alternately discharge the starting material for a capacitor strip and for a battery strip. The starting materials are introduced dry and do not contain any solvent. As a result, there is only little mixing of the starting materials for the capacitor strips and battery strips between the individual strips of the active material layer, so that the spatial distribution of the starting materials is essentially maintained during passage through the pressing apparatus.

The starting materials preferably comprise expanded graphite, with the expanded graphite together with the further components present in the starting materials forming a stable sheet during passage through the pressing apparatus.

In a further process for producing an electrode for a combination of supercapacitor and battery, the starting materials are firstly applied to a support or to a power outlet foil without addition of solvents by means of a plurality of application systems in one or more steps and subsequently pressed in a pressing apparatus to form a sheet.

In this embodiment, the support or the power outlet foil serve as substrate onto which the individual layers of the active structure are applied in succession. After each application of a layer, precompacting can firstly be carried out, for example by means of a roller or a doctor blade. In variants in which a support is used, the support is removed from the active structure either before passage through the pressing apparatus or after passage through the pressing apparatus. In this case, the active structure alone forms the electrode. If a power outlet foil is used, this remains joined to the active structure after passage through the pressing apparatus, so that the active structure together with the power outlet foil forms the electrode.

A calender or a static press, for example, is suitable as pressing apparatus.

A further aspect of the invention is to provide a combined supercapacitor and battery cell which comprises at least one of the electrodes described. Here, an electrode having battery strips configured as anode, a separator and an electrode having battery strips configured as cathode together with a housing form the combined supercapacitor and battery cell. The housing additionally comprises terminals via which the two electrodes are electrically contactable from the outside.

ADVANTAGES OF THE INVENTION

The proposed electrode makes it possible to combine a battery and a supercapacitor with one another directly in one component in a simple manner, with these being electrically connected in parallel. The proposed division of the electrode into strips, with capacitor strips and battery strips alternating in the plane of the active material layer, allows spatial separation of functions and thus separate optimization of the battery function and the capacitor function despite integration of the two functions in the same component.

The combined supercapacitor and battery cell which is likewise proposed can be subjected to high currents in the short term, as a result of which faster charging and discharging operations become possible. Here, the capacitor part can also be considered to be a safety buffer for the battery. The battery part is protected against high charging and discharging currents, so that it cannot be damaged even at high loads.

The integration of the graphite layer in the interior of the active material layer, as proposed in advantageous variants, advantageously improves the electrical conductivity of the active structure, so that the capacitor strips and battery strips can be made thick without there being problems with the electrical conductivity.

In the variants in which the active structure comprises three layers, with the active material layer being arranged between two graphite layers, the active structure is particularly mechanically stable. This makes it possible to reduce the proportion of binder in the active material layer, as a result of which the electrical conductivity in the active material layer is improved.

Furthermore, it is possible to configure the active structure in such a way that a stable sheet is formed after pressing, without it being necessary to provide an additional power outlet foil, for example a metal foil.

DETAILED DESCRIPTION

Figure 1:
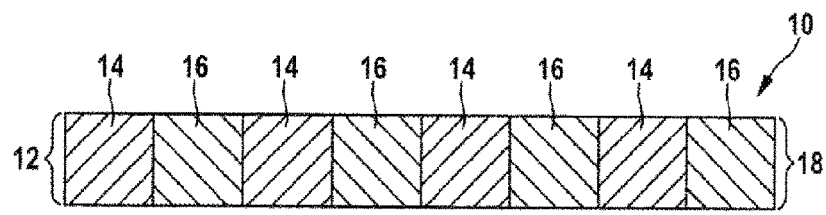
FIG. 1 shows a self-supporting active structure having an active material layer.

In the following description of working examples of the invention, identical or similar components or elements are denoted by the same reference numerals, with a repeated description of the components or elements in individual cases being omitted. The figures show the subject matter of the invention merely schematically.

FIG. 1 shows a first embodiment of an electrode 10 for a combination of supercapacitor and battery. The electrode 10 comprises an active structure 12 which, in the embodiment of FIG. 1, comprises only a single layer, namely the active material layer 18. FIG. 1 shows the electrode 10 in a sectional view from the side. It can be seen here that battery strips 14 and capacitor strips 16 are arranged alternately in the active material layer 18 of the active structure 12.

Figure 2:
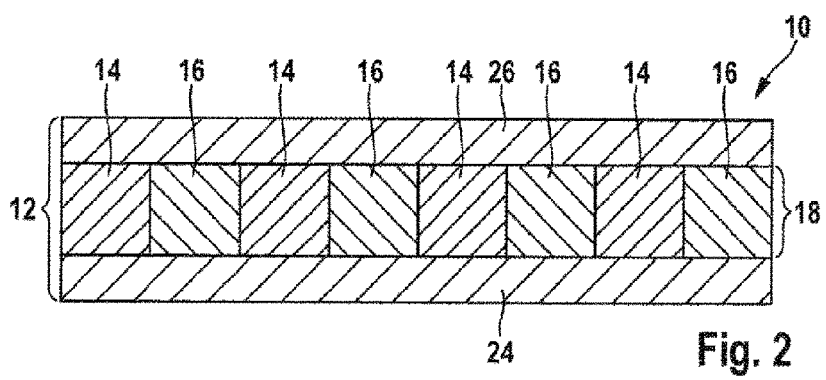
FIG. 2 shows a self-supporting active structure having an active material layer enclosed between two graphite layers.

FIG. 2 shows a second embodiment of the electrode 10, likewise in a sectional view from the side. The electrode 10 again comprises an active structure 12 which, in the embodiment of FIG. 2, comprises three layers. Here, the active structure 12 comprises a first graphite layer 24, the active material layer 18 and a second graphite layer 26 in this order. The active material layer 18 is thus covered on its upper side and on its underside in each case with a graphite layer 24, 26. As described above in respect of FIG. 1, the active material layer 18 has a strip structure, so that in the view from the side in FIG. 2 battery strips 14 and capacitor strips 16 alternate.

In a further variant which is not shown, it is conceivable for there to be no sharp transition but instead a continuous transition at the transitions between the active material layer 18 and the first graphite layer 24 and/or the second graphite layer 26. In this way, the active structure 12 can be configured so that a gradient is formed perpendicular to the plane of the active material layer 18. Here, the proportion of graphite is greatest at the surfaces of the active structure 12 and lowest in the middle of the active structure 12.

Figure 3:
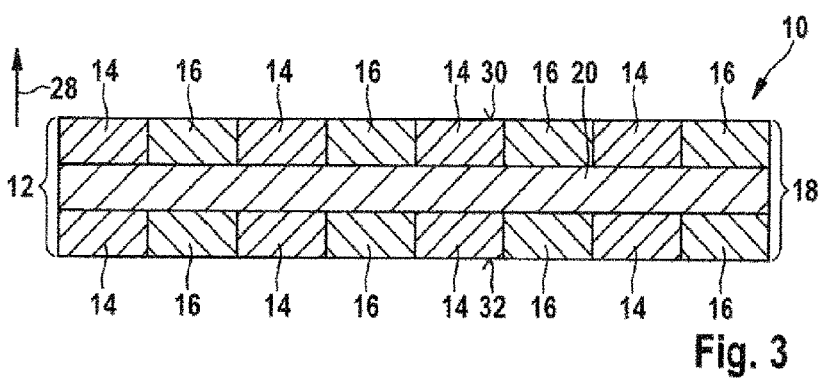
FIG. 3 shows a self-supporting active structure having an increased proportion of graphite in the middle.

FIG. 3 depicts a third embodiment of the electrode 10. FIG. 3 once again shows the electrode 10 in a sectional view from the side. The active structure 12 comprises the active material layer 18 in which battery strips 14 and capacitor strips 16 are once again arranged alternately. The active material layer 18 has a gradient in respect of its proportion of graphite in a direction perpendicular to the plane of the active material layer 18. The direction perpendicular to the plane is indicated by an arrow with the reference numeral 28 in FIG. 3.

Owing to the gradient, the distribution of graphite in the battery active material and in the capacitor active material, respectively, in the capacitor strips 16 and in the battery strips 14 is selected so that it is, viewed in the direction 28, highest in the middle of the active material layer 18 and decreases in the direction of an upper side 30 and an underside 32. The upper side 30 and the underside 32 form the surfaces of the electrode 10. As a result of the increased concentration of graphite in the middle of the active material layer 18, a conductive layer 20 located in the interior of the active structure 12 is formed after pressing of the active structure 12. The conductive layer 20 typically has an increased electrical conductivity.

In the embodiments depicted in FIG. 2 and FIG. 3, the conductivity of the first graphite layer 24, of the second graphite layer 26 and of the conductive layer 20 can be improved by adding an additional conductive material as additive to the graphite.

Figure 4:
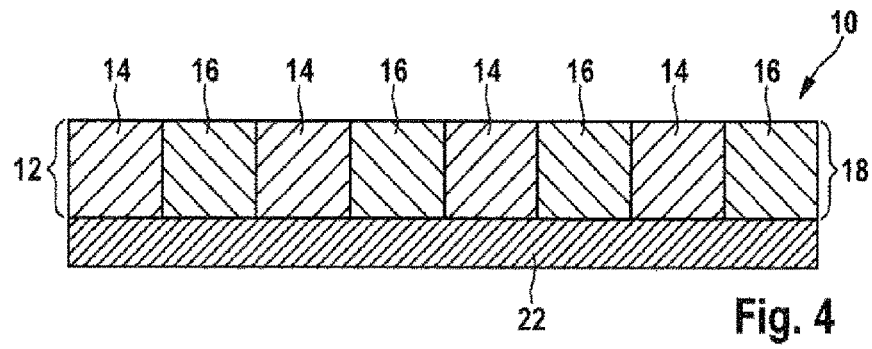
FIG. 4 shows an active structure with power outlet lead.
Figure 5:
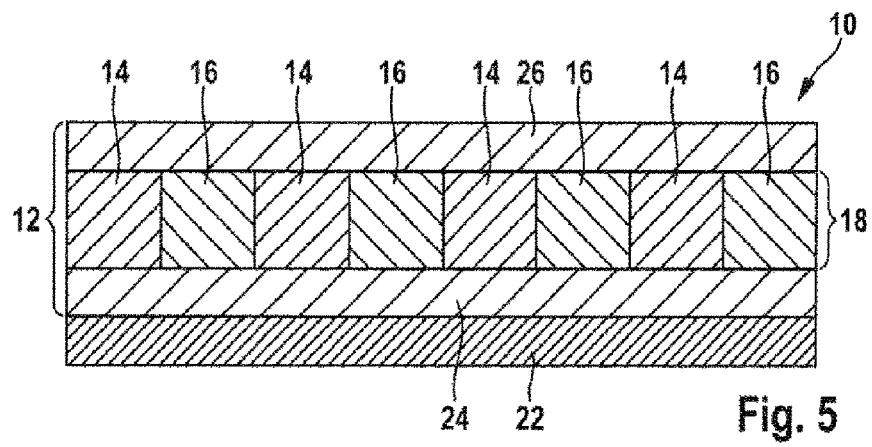
FIG. 5 shows a three-layer active structure with power outlet lead.
Figure 6:
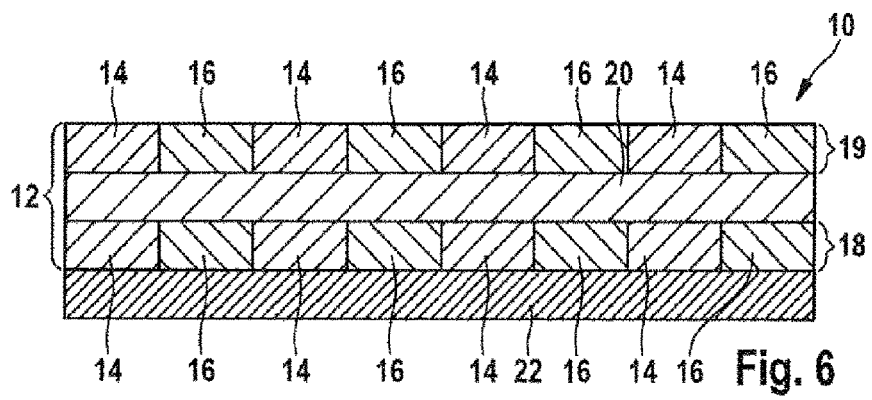
FIG. 6 shows an active structure on a power outlet lead having a conductive layer arranged in the middle of the active structure and FIG. 7 shows a sectional view of a combined supercapacitor and battery cell.

FIGS. 4, 5 and 6 show further embodiments of the electrode 10. Here, the embodiment of FIG. 4 corresponds essentially to the electrode 10 described above for FIG. 1, with the electrode 10 of FIG. 4 comprising a power outlet foil 22 in addition to the active structure 12. The power outlet foil 22 is joined to one side of the active structure 12. The power outlet foil 22 is firstly used for electrical contacting of the active structure 12, and secondly the power outlet foil 22 can mechanically support the active structure 12. This is useful particularly when the active structure 12 has only a small proportion of binders and/or graphite.

Except for the additional power outlet foil 22, the electrode 10 depicted in FIG. 5 corresponds to the electrode 10 described above in relation to FIG. 2. The power outlet foil 22 is again joined to one of the surfaces of the active structure 12.

The electrode 10 shown in FIG. 6 corresponds to the electrode 10 described above in relation to FIG. 3, with a power outlet foil 22 also being provided in addition to the active structure 12, so as to form, together with the active structure 12, the electrode 10.

Figure 7:
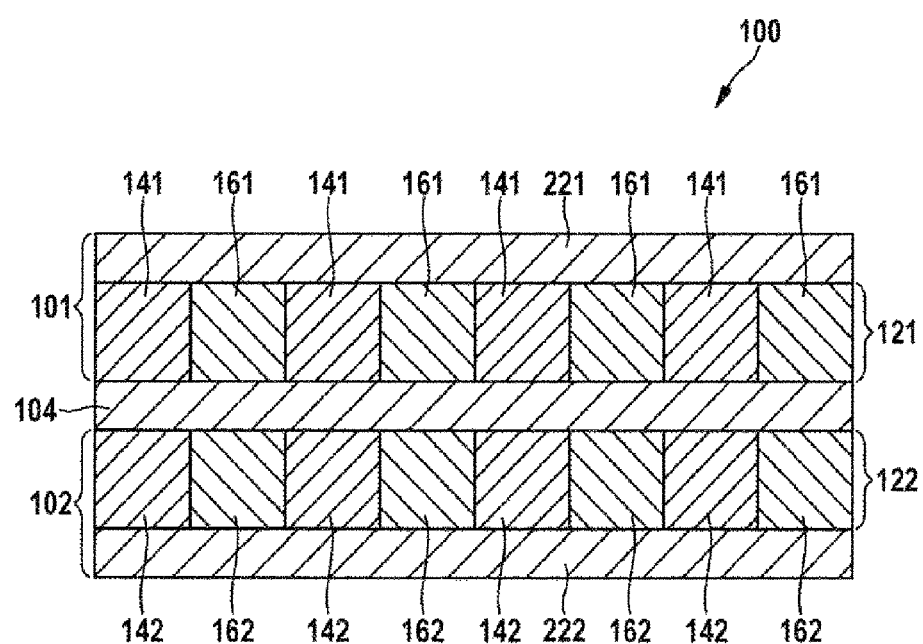

FIG. 7 shows a combined supercapacitor and battery cell in a sectional view.

FIG. 7 schematically shows a combined supercapacitor and battery cell 100 in a sectional view, with depiction of a cell housing having been omitted in the interests of simplicity. The combined supercapacitor and battery cell 100 comprises a layer sequence having an anode 101, a separator 104 and a cathode 102 in this order.

The structure of the anode 101 and of the cathode 102 correspond essentially to the structure of an electrode as described above in relation to FIG. 4. Here, the anode 101 comprises a first power outlet foil 221 together with an anode active structure 121 having anode battery strips 141 and anode capacitor strips 161. Correspondingly, the cathode 102 comprises a second power outlet foil 222 together with a cathode active structure 122 having cathode battery strips 142 and capacitor strips 162.

The separator 104 is arranged between anode 101 and cathode 102 in order to separate the anode 101 electrically and mechanically from the cathode 102 but allow flow of ions between anode 101 and cathode 102. To effect electrical contacting of the combined supercapacitor and battery cell 100, terminals assigned to the cell housing are in each case electrically connected to the first power outlet foil 221 and the second power outlet foil 222.

The invention is not restricted to the working examples described here and the aspects emphasized therein. Rather, many modifications which are of the kind that a person skilled in the art would routinely make are possible within the scope defined by the claims.

The invention claimed is:

1. An electrode for a combination of supercapacitor and battery, comprising an active structure, wherein the active structure comprises an active material layer which is divided stripwise in a plane, with capacitor strips and battery strips being arranged alternately in the plane so that a pair of the battery strips are disposed on opposing sides of at least one of the capacitor strips and a pair of the capacitor strips are disposed on opposing sides of at least one of the battery strips.

2. The electrode according to claim 1, wherein the active structure comprises three layers, with a first graphite layer, the active material layer and a second graphite layer being arranged in this order.

3. The electrode according to claim 2, wherein the active material layer is free of binders.

4. The electrode according to claim 2, wherein at least one of the first graphite layer and the second graphite layer comprises a conductive material as additive.

5. The electrode according to claim 1, wherein a proportion of graphite and/or of a binder is lowest in a middle of the active material layer and increases in a direction of two surfaces of the electrode.

6. The electrode according to claim 1, wherein a proportion of graphite is highest in a middle of the active material layer and decreases in a direction of two surfaces of the electrode.

7. The electrode according to claim 1, wherein the electrode further comprises a power outlet foil on which the active structure is arranged.

8. A combined supercapacitor and battery cell comprising at least one electrode according to claim 1.

9. The electrode according to claim 1, wherein the plurality of capacitor strips and the plurality of battery strips being arranged alternately in the plane include at least three of the battery strips being arranged alternately in the plane with at least three of the capacitor strips so that at least two of the battery strips are disposed on opposing sides by adjacent ones of the capacitor strips that are in contact therewith and at least two of the capacitor strips are disposed on opposing side by adjacent ones of the battery strips that are in contact therewith.

10. The electrode according to claim 1, wherein the pair of the battery strips are in contact with the opposing sides of at least one of the capacitor strips and the pair of the capacitor strips are disposed in contact with the opposing sides of at least one of the battery strips.

11. A process to produce an electrode having an active structure that includes an active material layer divided stripwise in a plane, with capacitor strips and battery strips arranged alternately in the plane so that a pair of the battery strips are disposed on opposing sides of at least one of the capacitor strips and a pair of the capacitor strips are disposed on opposing sides of at least one of the battery strips for a combination of supercapacitor and battery, including introducing starting materials for the active structure together into a pressing apparatus and pressing without addition of solvents to form a sheet, with the starting materials being introduced spatially distributed into the pressing apparatus by a plurality of application systems.

12. A process to produce an electrode having an active structure that includes an active material layer divided stripwise in a plane, with capacitor strips and battery strips arranged alternately in the plane so that a pair of the battery strips are disposed on opposing sides of at least one of the capacitor strips and a pair of the capacitor strips are disposed on opposing sides of at least one of the battery strips for a combination of supercapacitor and battery, including firstly applying starting materials for the active structure to a support or to a power outlet foil without addition of solvents by a plurality of application systems in one or more steps, and subsequently pressing the starting materials for the active structure applied to the support or to the power outlet foil in a pressing apparatus to form a sheet.

\* \* \* \* \*